United States Patent
Yeon et al.

(10) Patent No.: US 11,817,268 B2
(45) Date of Patent: Nov. 14, 2023

(54) MULTILAYER CERAMIC ELECTRONIC COMPONENT

(71) Applicant: SAMSUNG ELECTRO-MECHANICS CO., LTD., Suwon-si (KR)

(72) Inventors: Gyu Ho Yeon, Suwon-si (KR); Won Kuen Oh, Suwon-si (KR); Seo Won Jung, Suwon-si (KR); Seo Ho Lee, Suwon-si (KR)

(73) Assignee: SAMSUNG ELECTRO-MECHANICS CO., LTD., Suwon-si (KR)

( * ) Notice: Subject to any disclaimer, the term of this patent is extended or adjusted under 35 U.S.C. 154(b) by 23 days.

(21) Appl. No.: 17/723,938

(22) Filed: Apr. 19, 2022

(65) Prior Publication Data
US 2023/0207204 A1    Jun. 29, 2023

(30) Foreign Application Priority Data

Dec. 29, 2021    (KR) .......................... 10-2021-0191599

(51) Int. Cl.
*H01G 4/232*    (2006.01)
*H01G 4/30*    (2006.01)

(52) U.S. Cl.
CPC ............. *H01G 4/2325* (2013.01); *H01G 4/30* (2013.01)

(58) Field of Classification Search
CPC ........ H01G 4/2325; H01G 4/30; H01G 4/248; H01G 4/252; H01G 4/228
See application file for complete search history.

(56) References Cited

U.S. PATENT DOCUMENTS

| | | | |
|---|---|---|---|
| 11,393,627 B2 * | 7/2022 | Yun | H01G 4/2325 |
| 2011/0051314 A1 * | 3/2011 | Sakurai | H01G 4/30 |
| | | | 361/321.1 |
| 2016/0379758 A1 * | 12/2016 | Otani | H01G 4/2325 |
| | | | 361/301.4 |
| 2021/0090801 A1 * | 3/2021 | Sawada | H01G 4/2325 |
| 2021/0090803 A1 * | 3/2021 | Kang | H01G 4/30 |
| 2021/0090804 A1 * | 3/2021 | Park | H01G 4/2325 |
| 2022/0115184 A1 * | 4/2022 | Yun | H01G 4/012 |
| 2022/0189696 A1 * | 6/2022 | Yi | H01G 4/248 |
| 2023/0207204 A1 * | 6/2023 | Yeon | H01G 4/30 |
| | | | 361/301.4 |

FOREIGN PATENT DOCUMENTS

| | | | | |
|---|---|---|---|---|
| JP | 2006278162 A | * | 10/2006 | |
| JP | 4153206 B2 | * | 9/2008 | ........... H01G 4/0085 |
| JP | 2011187225 A | * | 9/2011 | |

(Continued)

*Primary Examiner* — Dion R. Ferguson
(74) *Attorney, Agent, or Firm* — Morgan, Lewis & Bockius LLP

(57) ABSTRACT

A multilayer ceramic electronic component includes: a ceramic body including dielectric layers and internal electrodes; first electrode layers disposed on the ceramic body and connected to the internal electrodes, respectively; and second electrode layers disposed on the first electrode layers, respectively, and respectively including a conductive metal including silver and palladium, carbon materials, and glass particles, wherein an area ratio of the carbon materials in a cross section of at least a portion of each of the second electrode layers is 1 to 5%.

19 Claims, 7 Drawing Sheets

(56) References Cited

FOREIGN PATENT DOCUMENTS

| JP | 2021-052103 A | | 4/2021 |
|---|---|---|---|
| KR | 10-2019-0094138 A | | 8/2019 |
| KR | 10-2019-0116179 A | | 10/2019 |
| KR | 20190116177 A | * | 10/2019 |
| KR | 20220096927 A | * | 7/2022 |

* cited by examiner

FIG. 8

MULTILAYER CERAMIC ELECTRONIC COMPONENT

CROSS-REFERENCE TO RELATED APPLICATION(S)

This application claims benefit of priority to Korean Patent Application No. 10-2021-0191599 filed on Dec. 29, 2021 in the Korean Intellectual Property Office, the disclosure of which is incorporated herein by reference in its entirety.

TECHNICAL FIELD

The present disclosure relates to a multilayer ceramic electronic component.

BACKGROUND

A multilayer ceramic capacitor (MLCC), a multilayer ceramic electronic component, is an important chip component used in industries such as the communications, computing, home appliance, and automobile industries, among others, since it has a small size and implements high capacitance, and is a core passive element used particularly in various electric, electronic, information communications devices such as a mobile phone, a computer, and a digital television (TV).

In the related art, in order to mount the multilayer ceramic capacitor on a substrate or the like, an external electrode of the multilayer ceramic capacitor has included a plating layer formed on an electrode layer. However, due to warpage of the substrate and oxidation of tin (Sn) included in the plating layer at the time of mounting the multilayer ceramic capacitor on the substrate caused by a high-temperature environment, a problem such as a solder cracking or an increase in contact resistance has occurred.

In order to solve such a problem, an external electrode structure including an electrode layer including copper (Cu) and an electrode layer including silver (Ag) and palladium (Pd) has been used. When such an external electrode is used, the multilayer ceramic capacitor may be mounted on the substrate using Ag epoxy as a conductive glue instead of tin soldering.

However, in a case of such a secondary external electrode structure, a peel-off phenomenon in which the electrode layers are separated or peeled off from each other may occur, and heat resistance characteristics may be weak. Therefore, a multilayer ceramic capacitor in which adhesive strength between electrodes and heat resistance and moisture resistance characteristics are improved has been demanded.

SUMMARY

An aspect of the present disclosure may provide a multilayer ceramic electronic component having improved heat and moisture resistance characteristics by including external electrodes having excellent adhesive strength and impact resistance.

However, an aspect of the present disclosure is not limited thereto, and may be more easily understood in a process of describing exemplary embodiments in the present disclosure.

According to an aspect of the present disclosure, a multilayer ceramic electronic component may include: a ceramic body including dielectric layers and internal electrodes; first electrode layers disposed on the ceramic body and connected to the internal electrodes, respectively; and second electrode layers disposed on the first electrode layers, respectively, and respectively including a conductive metal including silver and palladium, carbon materials, and glass particles, wherein an area ratio of the carbon materials in a cross section of at least a portion of each of the second electrode layers is 1 to 5%.

According to an aspect of the present disclosure, a method for manufacturing the multilayer ceramic electronic component may include: contacting a first electrode layer with a conductive paste including a conductive metal including silver (Ag) and palladium (Pd), carbon materials, and glass particles to form a second electrode layer, wherein the first electrode layer is disposed on a body of the multilayer ceramic electronic component, and sintering the conductive paste at a temperature of from 600 to 700° C. for 1 to 2 hours.

BRIEF DESCRIPTION OF DRAWINGS

The above and other aspects, features, and advantages of the present disclosure will be more clearly understood from the following detailed description taken in conjunction with the accompanying drawings, in which:

FIG. 8 is a compilation of captured images of an ion migration phenomenon according to an area ratio of carbon materials;

DETAILED DESCRIPTION

Figure 1:
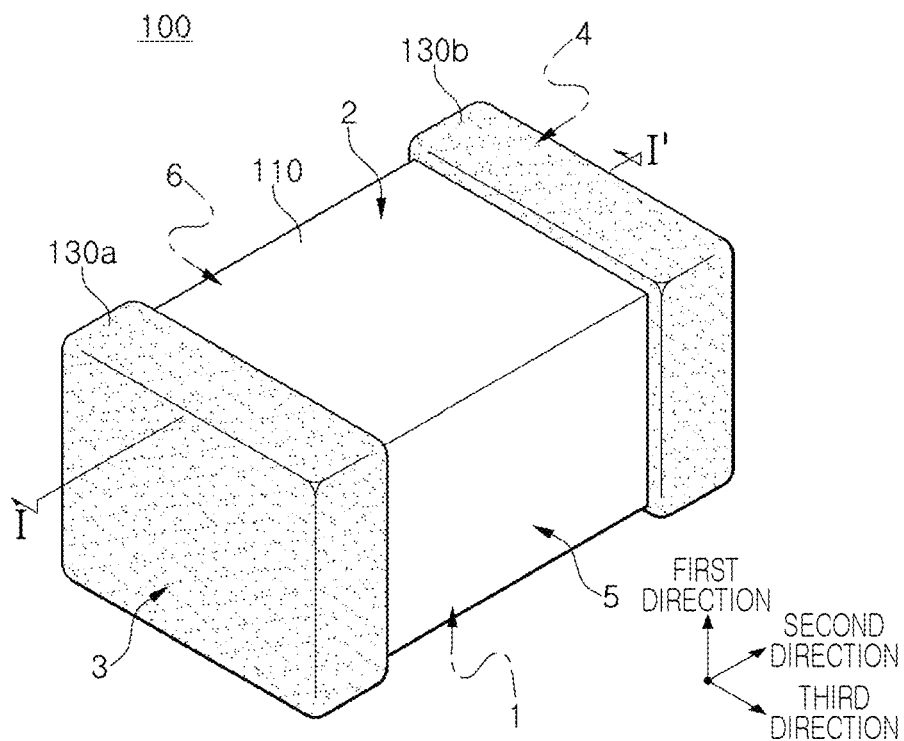
FIG. 1 is a perspective view illustrating a multilayer ceramic electronic component according to an exemplary embodiment in the present disclosure.

In the drawings, a first direction may refer to a stacking direction or a thickness T direction, a second direction may refer to a length L direction, and a third direction may refer to a width W direction.

FIG. 1 is a perspective view illustrating a multilayer ceramic electronic component according to an exemplary embodiment in the present disclosure.

Figure 2:
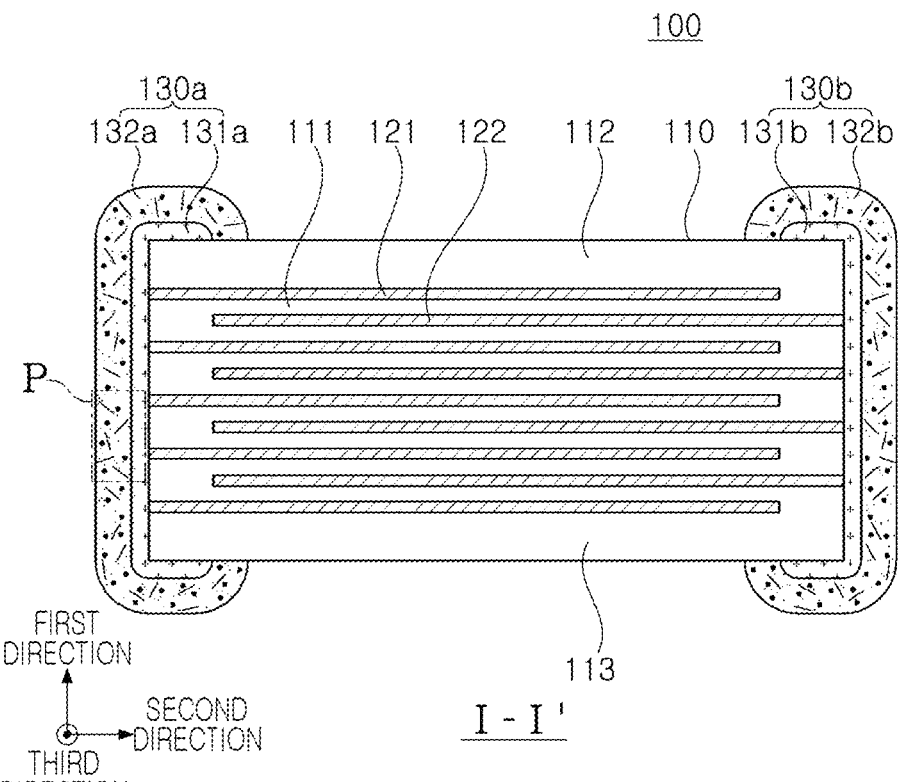
FIG. 2 is a cross-sectional view taken along line I-I' of FIG. 1.

FIG. 2 is a cross-sectional view taken along line I-I' of FIG. 1.

Figure 3:
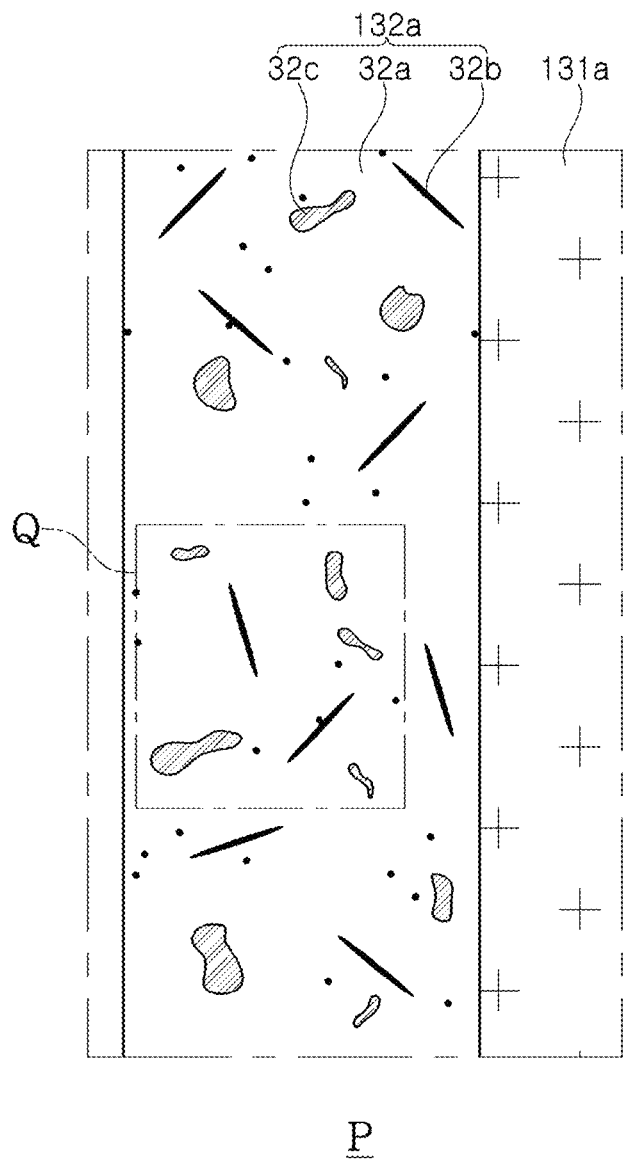
FIG. 3 is an enlarged view of region P of FIG. 2.

FIG. 3 is an enlarged view of region P of FIG. 2.

Figure 4:
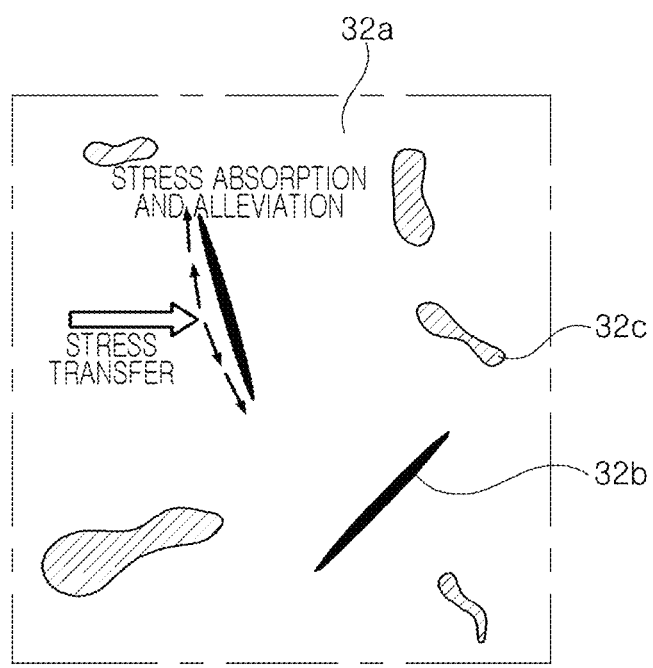
FIG. 4 is an enlarged view of region Q of FIG. 3.

FIG. 4 is an enlarged view of region Q of FIG. 3.

Hereinafter, a multilayer ceramic electronic component 100 according to an exemplary embodiment in the present disclosure will be described with reference to FIGS. 1 through 4.

A multilayer ceramic electronic component 100 according to an exemplary embodiment in the present disclosure may include a ceramic body 110 including dielectric layers 111 and internal electrodes 121 and 122, first electrode layers 131a and 131b disposed on the ceramic body 110 and connected to the internal electrodes 121 and 122, respectively, and second electrode layers 132a and 132b disposed on the first electrode layers 131a and 131b, respectively, and respectively including a conductive metal 32a including silver (Ag) and palladium (Pd), carbon materials 32b, and glass particles 32c, wherein an area ratio of the carbon materials 32b in a cross section of at least a portion of each of the second electrode layers 132a and 132b is 1 to 5%.

A specific shape of the ceramic body 110 is not particularly limited, and may be a hexahedral shape or a shape similar to the hexahedral shape, as illustrated in FIGS. 1 and 2. Although the ceramic body 110 does not have a hexahedral shape with perfectly straight lines due to shrinkage of ceramic powder particles included in the ceramic body 110 in a sintering process or polishing of edge portions, the ceramic body 110 may have substantially the hexahedral shape.

The ceramic body 110 may have first and second surfaces 1 and 2 opposing each other in the first direction, third and fourth surfaces 3 and 4 connected to the first and second surfaces 1 and 2 and opposing each other in the second direction, and fifth and sixth surfaces 5 and 6 connected to the first and second surfaces 1 and 2, connected to the third and fourth surfaces 3 and 4, and opposing each other in the third direction.

The ceramic body 110 may include the dielectric layers 111 and the internal electrodes 121 and 122 alternately stacked therein. A plurality of dielectric layers 111 forming the ceramic body 110 may be in a sintered state, and adjacent dielectric layers 111 may be integrated with each other so that boundaries therebetween are not readily apparent without using a scanning electron microscope (SEM).

The dielectric layer 111 may be formed by sintering a ceramic green sheet including ceramic powder particles, an organic solvent, and a binder. The ceramic powder is not particularly limited as long as it may obtain sufficient capacitance, and may be, for example, a barium titanate ($BaTiO_3$)-based material a strontium titanate ($SrTiO_3$)-based material, or the like, but the present disclosure is not limited thereto.

In this case, a thickness of the dielectric layer 111 may be 10 μm or less in consideration of a size and capacitance of the ceramic body 110, and may be 0.6 μm or less and more preferably 0.4 μm or less for miniaturization and a capacitance increase of the multilayer ceramic electronic component 100, but the present disclosure is not limited thereto.

Here, the thickness of the dielectric layers 111 refers to an average thickness of the dielectric layer 111 disposed between the internal electrodes 121 and 122. The thickness of the dielectric layer 111 may be measured by scanning a cross section of the ceramic body 110 in the first and second directions with a scanning electron microscope having a magnification of 10,000. More specifically, an average value may be measured by measuring thicknesses of one dielectric layer 111 at a plurality of points of the one dielectric layer 111, for example, at 30 points disposed at equal intervals in the second direction. In addition, when average values of the plurality of dielectric layers 111 are measured, an average thickness of the dielectric layer 111 may further be generalized.

The ceramic body 110 may include a capacitance formation portion disposed in the ceramic body 110 and forming capacitance by including a plurality of first internal electrodes 121 and a plurality of second internal electrodes 122 disposed to face each other with each of the dielectric layers 111 interposed therebetween, a first cover portion 112 formed on an upper surface of the capacitance formation portion, and a second cover portion 113 disposed on a lower surface of the capacitance formation portion. The first cover portion 112 and the second cover portion 113 may be formed by stacking a single dielectric layer or two or more dielectric layers on the upper and lower surfaces of the capacitance formation portion, respectively, and may basically serve to prevent damage to the internal electrodes due to physical or chemical stress. The first and second cover portions 112 and 113 may have the same configuration as the dielectric layer 111 except that they do not include the internal electrodes. Each of the first and second cover portions 112 and 113 may have a thickness of 20 μm or less, but the present disclosure is not limited thereto.

The internal electrodes 121 and 122 and the dielectric layers 111 may be alternately disposed, and the plurality of first internal electrodes 121 and the plurality of second internal electrodes 122 may be disposed to face each other with respective dielectric layers 111 interposed therebetween. That is, the first and second internal electrodes 121 and 122, which are a pair of electrodes having different polarities, may be formed to be alternately exposed, respectively, through the third and fourth surfaces 3 and 4 of the ceramic body 110 in the stacking direction of the dielectric layers 111.

For example, each of the plurality of first internal electrodes 121 may be spaced apart from the fourth surface 4 of the ceramic body 110 and be exposed through the third surface 3 of the ceramic body 110. In addition, each of the plurality of second internal electrodes 122 may be spaced apart from the third surface 3 of the ceramic body 110 and be exposed through the fourth surface 4 of the ceramic body 110. The plurality of first internal electrodes 121 and the plurality of second internal electrodes 122 may be electrically separated from each other by each of the dielectric layers 111 disposed therebetween. The plurality of first internal electrodes 121 and the plurality of second internal electrodes 122 may be alternately stacked in the first direction, but are not limited thereto, and may also be alternately stacked in the third direction.

Each of the internal electrodes 121 and 122 may be formed by printing a conductive paste for an internal electrode including a conductive metal at a predetermined thickness on ceramic green sheet. A method of printing the conductive paste for an internal electrode may be a screen printing method, a gravure printing method, or the like, but the present disclosure is not limited thereto.

The conductive metal included in each of the internal electrodes 121 and 122 may be one or more of nickel (Ni), copper (Cu), palladium (Pd), silver (Ag), gold (Au), platinum (Pt), tin (Sn), tungsten (W), titanium (Ti), and alloys thereof, and the present disclosure is not limited thereto.

In this case, a thickness of each of the internal electrodes 121 and 122 may be 10 μm or less in consideration of a size and capacitance of the ceramic body 110, and may be 0.6 μm or less and more preferably 0.4 μm or less for miniaturization and a capacitance increase of the multilayer ceramic electronic component 100, but the present disclosure is not limited thereto.

Here, the thickness of each of the internal electrodes 121 and 122 may refer to an average thickness of each of the internal electrodes 121 and 122. The average thickness of each of the internal electrodes 121 and 122 may be measured by scanning the cross section of the ceramic body 110 in the first and second directions with a scanning electron microscope having a magnification of 10,000. More specifically, an average value may be measured by measuring thicknesses of one internal electrode at a plurality of points of the one internal electrode, for example, at 30 points disposed at equal intervals in the second direction. When an average thickness of a plurality of internal electrodes is measured, the average thickness of the internal electrode may be further generalized.

The first and second internal electrodes 121 and 122 may be electrically connected to first and second external electrodes 130a and 130b, respectively, through the first electrode layers 131a and 131b disposed on the third and fourth surfaces 3 and 4 of the ceramic body 110, respectively.

Accordingly, when voltages are applied to the first and second external electrodes 130a and 130b, electric charges may be accumulated between the first and second internal electrodes 121 and 122 facing each other. In this case, capacitance of the multilayer ceramic electronic component 100 may be in proportion to an area of regions of the first and second internal electrodes 121 and 122 overlapping each other.

The external electrodes 130a and 130b may be disposed on the third and fourth surfaces 3 and 4 of the ceramic body 110, respectively, and may extend to portions of each of the first, second, fifth and sixth surfaces 1, 2, 5, and 6. The external electrodes 130a and 130b may include the first external electrode 130a and the second external electrode 130b respectively connected to the plurality of first internal electrodes 121 and the plurality of second internal electrodes 122. The external electrodes 130a and 130b may be formed of any material having electrical conductivity, such as a metal, a specific material of each of the external electrodes 130a and 130b may be determined in consideration of electrical characteristics, structural stability and the like, and furthermore, the external electrodes 130a and 130b may have a multilayer structure.

For example, the first and second external electrodes 130a and 130b may include, respectively, the first electrode layers 131a and 131b disposed on the ceramic body 110 and respectively connected to the first and second internal electrodes 121 and 122, and the second electrode layers 132a and 132b each disposed on the first electrode layers 131a and 131b.

In this case, the first electrode layers 131a and 132b may serve to mechanically couple the ceramic body 110 to the external electrodes 130a and 130b, respectively. The first electrode layers 131a and 131b may be connected to the plurality of first and second internal electrodes 121 and 122 exposed alternately through the third and fourth surfaces 3 and 4 of the ceramic body 110, respectively, to secure electrical conduction between the first and second external electrodes 130a and 130b and the first and second internal electrodes 121 and 122, respectively. Meanwhile, a thickness of each of the first electrode layers 131a and 131b does not need to be particularly limited, but may be, for example, 5 to 30 μm.

In this case, the first electrode layers 131a and 132a may include a conductive metal and a glass. The conductive metal of the first electrode layers 131a and 131b may include, for example, copper (Cu). The first electrode layers 131a and 131b may be formed by dipping the third and fourth surfaces 3 and 4 of the ceramic body 110 in a conductive paste including a conductive metal and a glass and then sintering the conductive paste. Alternatively, the first electrode layers 131a and 131b may be formed by transferring a sheet including a conductive metal and a glass.

The second electrode layers 132a and 132b may be disposed on the first electrode layers 131a and 131b, respectively, and may include silver (Ag) and palladium (Pd) as the conductive metal 32a. The second electrode layers 132a and 132b may be electrically connected to the first electrode layers 131a and 131b, respectively, and may include silver (Ag) and palladium (Pd) to serve to prevent oxidation and prevent penetration of external moisture and hydrogen. In addition, due to the conductive metal 32a including silver (Ag), the multilayer ceramic electronic component 100 may be mounted on a ceramic substrate without using a solder including tin (Sn) by applying a conductive glue such as silver (Ag) epoxy onto the second electrode layers 132a and 132b. Accordingly, a problem such as a solder crack occurring due to stress caused by a difference in a coefficient of thermal expansion between the external electrode and the solder in a high-temperature and low-temperature cycle may be solved.

In this case, when the conductive metal 32a included in each of the second electrode layers 132a and 132b is formed of only silver (Ag) or a content of silver (Ag) in the conductive metal 32a is excessively high, an ion migration phenomenon may occur in a high-temperature environment. In this case, the second electrode layers 132a and 132b may further include palladium (Pd), and the ion migration phenomenon may thus be prevented. In this case, palladium (Pd) may be replaced or mixed with other metals capable of preventing the ion migration phenomenon, such as platinum (Pt) and/or gold (Au).

The glass particles 32c may control a sintering speed of the conductive metal 32a when the second electrode layers 132a and 132b are formed by applying and sintering a conductive paste, and may fill empty spaces when the conductive metal 32a is contracted in a sintering process, thereby increasing compactness of the second electrode layers 132a and 132b. Therefore, penetration of external moisture may be effectively suppressed.

The glass particles 32c may be a composition in which oxides are mixed with each other, and may be one or more selected from the group consisting of silicon oxide, boron oxide, aluminum oxide, transition metal oxide, alkali metal oxide, and alkaline earth metal oxide, but is not limited thereto. A transition metal may be selected from the group consisting of zinc (Zn), titanium (Ti), vanadium (V), manganese (Mn), iron (Fe), and nickel (Ni), an alkali metal may be selected from the group consisting of lithium (Li), sodium (Na) and potassium (K), and an alkaline earth metal may be at least one selected from the group consisting of magnesium (Mg), calcium (Ca), strontium (Sr), and barium (Ba).

The carbon material 32b may be sufficient as long as it is a carbon allotrope, and may be a carbon material 32b that does not have conductivity. The carbon material 32b having conductivity may have an advantage such as excellent electrical conductivity, but it may be sufficient that the carbon material 32b is a material capable of preventing an ion migration phenomenon or improving adhesive strength even though it does not have the conductivity.

For example, the carbon material 32b may include one or more of graphene, carbon nanotubes, fullerene, and black carbon, but the present disclosure is not limited thereto. Since the carbon materials 32b are stable even at a high temperature and have excellent mechanical properties, when the carbon materials 32b are uniformly distributed in the second electrode layers 132a and 132b, the carbon materials 32b may absorb an external impact. In addition, since a rate of change of the carbon materials 32b according to a temperature is low, the carbon materials 32b may improve strength and heat resistance characteristics of the multilayer ceramic electronic component 100.

The second electrode layers 132a and 132b may be formed by applying and drying a conductive paste including the conductive metal including silver (Ag) and palladium (Pd), the carbon materials, and the glass particles, and sintering the conductive paste at a low temperature at 600 to 700° C. for 1 to 2 hours.

Figure 5:
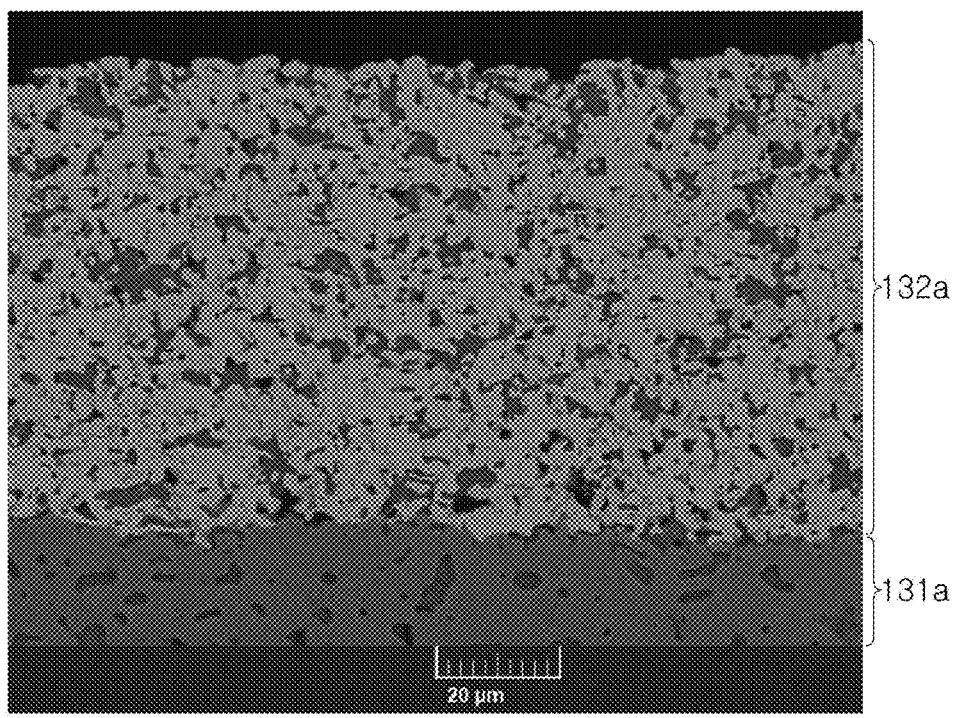
FIG. 5 is an image obtained by analyzing a cross section of first and second electrode layers using a scanning electron microscope (SEM)

FIG. 5 is an image obtained by analyzing a cross section of first and second electrode layers using a scanning electron microscope (SEM). More specifically, FIG. 5 is an image obtained by analyzing a region in which a length in the second direction×a length in the third direction is 135 μm×95 μm in a cross section in the second and third directions passing through the center of the multilayer ceramic electronic component 100 in the first direction.

Figure 6:
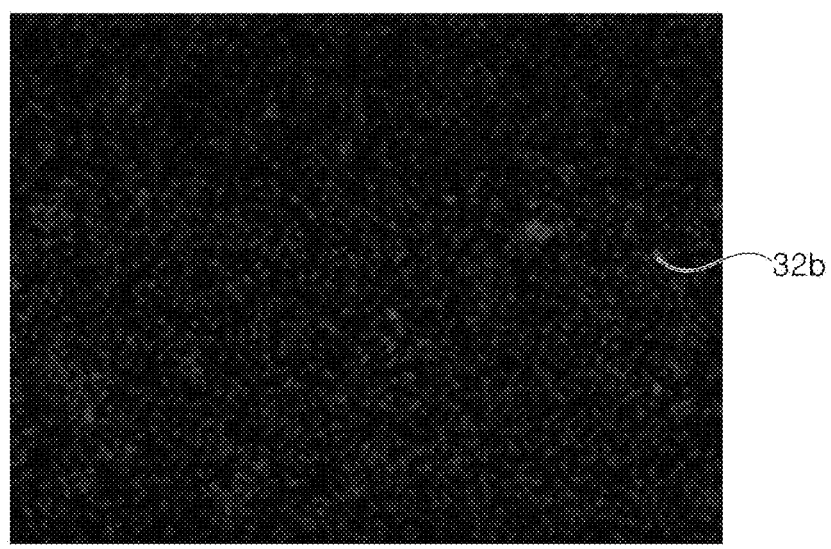
FIG. 6 is an image obtained by mapping carbon elements through energy dispersive X-ray spectroscopy (EDS)

FIG. 6 is an image obtained by mapping carbon elements through energy dispersive X-ray spectroscopy (EDS). More specifically, FIG. 6 is an image obtained by mapping carbon (C) elements to a region in which a length in the second direction×a length in the third direction=60 μm×40 μm in a scanning electron microscope (SEM) image of a cross section of each of the second electrode layers 132a and 132b in the second and third directions scanned at a magnification of 2,000. The brighter the region in the image, the higher the content of carbon element.

Through FIGS. 5 and 6, an area occupied by the carbon materials 32b in the second electrode layers 132a and 132b may be measured, and it can be seen that the carbon materials 32b are uniformly distributed in the second electrode layers 132a and 132b.

According to an exemplary embodiment in the present disclosure, an area ratio of the carbon materials 32b in a cross section of at least a portion of each of the second electrode layers 132a and 132b may be 1 to 5%.

As an example of a method of measuring the area ratio of the carbon materials 32b, the area ratio of the carbon materials 32b may be measured by capturing an image of the second electrode layers 132a and 132b with the scanning electron microscope (SEM) and mapping the carbon elements through the energy dispersive X-ray spectroscopy (EDS), in a cross section in the second and third directions passing through the center of the multilayer ceramic electronic component 100 in the first direction or in a cross section in the first and second directions passing through the center of the multilayer ceramic electronic component 100 in the third direction, as illustrated in FIGS. 5 and 6. The images may be processed by, for example, ImageJ.

When an electric field is applied to the multilayer ceramic electronic component 100, an ion migration phenomenon in which silver (Ag) included in the second electrode layers 132a and 132b are ionized and migrate to the first electrode layers 131a and 131b may occur, such that reliability of the multilayer ceramic electronic component 100 may be decreased. In this case, when the area ratio of the carbon materials 32b in the cross section of at least a portion of each of the second electrode layers 132a and 132b is 1 to 5%, the ion migration phenomenon may be prevented, such that the reliability of the multilayer ceramic electronic component 100 may be improved. This is because a relative volume of silver (Ag) is decreased by the carbon materials 32b included in the second electrode layers 132a and 132b and the carbon materials 32b effectively suppress migration of silver (Ag).

In addition, when the area ratio of the carbon materials 32b in the cross section of at least a portion of each of the second electrode layers 132a and 132b is in the range of 1 to 5%, the carbon materials 32b may be uniformly distributed in the second electrode layers 132a and 132b, such that adhesive strength and impact resistance of the second electrode layers 132a and 132b may be improved. The carbon materials 32b may have excellent elasticity, impact resistance, stiffness against deformation, and the like, depending on their types to serve to absorb and alleviate externally transferred stress, such that the adhesive strength and the impact resistance of the second electrode layers 132a and 132b may be improved.

When the area ratio of the carbon materials 32b in the cross section of at least a portion of each of the second electrode layers 132a and 132b is less than 1%, the carbon materials 32b may not be sufficiently distributed, such that heat resistance characteristics may be deteriorated and a silver (Ag) ion migration suppressing effect may be decreased. In addition, the carbon materials 32b may not be sufficiently distributed, such that impact resistance may be decreased. Accordingly, when the adhesive strength is evaluated, the first electrode layers 131a and 131b may be destroyed, or a peel-off phenomenon or the like of the second electrode layers 132a and 132b may occur.

When the area ratio of the carbon materials 32b in the cross section of at least a portion of each of the second electrode layers 132a and 132b exceeds 5%, the carbon materials 32b may not be uniformly distributed in the second electrode layers 132a and 132b and may agglomerate with each other in the second electrode layers 132a and 132b at the time of performing sintering, such that adhesive strength of the second electrode layers 132a and 132b may be decreased. In particular, when the area ratio of the carbon materials 32b is 10% or more, the carbon materials 32b may agglomerate with each other at the time of performing the sintering to form a large amount of air gaps or cause blisters or the like in the external electrodes. Accordingly, a peel-off phenomenon between the first electrode layers 131a and 131b and the second electrode layers 132a and 132b may occur, and an adhesive force between the second electrode layers 132a and 132b and the silver epoxy used when the multilayer ceramic electronic component 100 is mounted on the ceramic substrate may be decreased.

The carbon materials 32b may have various shapes depending on types of carbon allotropes and may have a spherical or plate-shaped shape, but the present disclosure is not limited thereto, and the carbon materials 32b may include both the spherical and plate-shaped carbon materials 32b. In particular, when the carbon materials 32b include graphenes, the graphenes may be dispersed in a plate shape, but the present disclosure is not limited thereto.

In an exemplary embodiment in the present disclosure, a diameter of the carbon material 32b may be 0.25 μm to 4 μm. The diameter of the carbon material 32b may be determined by capturing an image of the second electrode layers 132a and 132b with the scanning electron microscope (SEM) in the cross section in the second and third directions or in the cross section in the first and second directions, mapping carbon elements through the energy dispersive X-ray spectroscopy (EDS), and then using a program within the EDS.

In an exemplary embodiment in the present disclosure, ten or more carbon materials 32b may be disposed per area of 2500 μm² of the cross section. Here, the cross section may refer to a cross section of each of the second electrode layers 132a and 132b in the first and second directions or a cross section of the second electrode layers 132a and 132b in the second and third directions for measuring the area ratio of the carbon materials 32b. The measurement of the number of carbon materials 32b is not particularly limited. For example, the number of carbon materials 32b may be measured within an area of 50 μm×50 μm (width×length) in each of the second electrode layers 132a and 132b, but the present disclosure is not limited thereto.

As an example of a method of measuring the number of carbon materials 32b, the number of carbon materials 32b may be measured by mapping carbon elements through the energy dispersive X-ray spectroscopy (EDS) within an area of 50 μm×50 μm (width×length) of each of the second electrode layers 132a and 132b extracted from an image obtained by scanning the cross section with the scanning electron microscope (SEM) or a transmission electron microscope (TEM).

Figure 7:
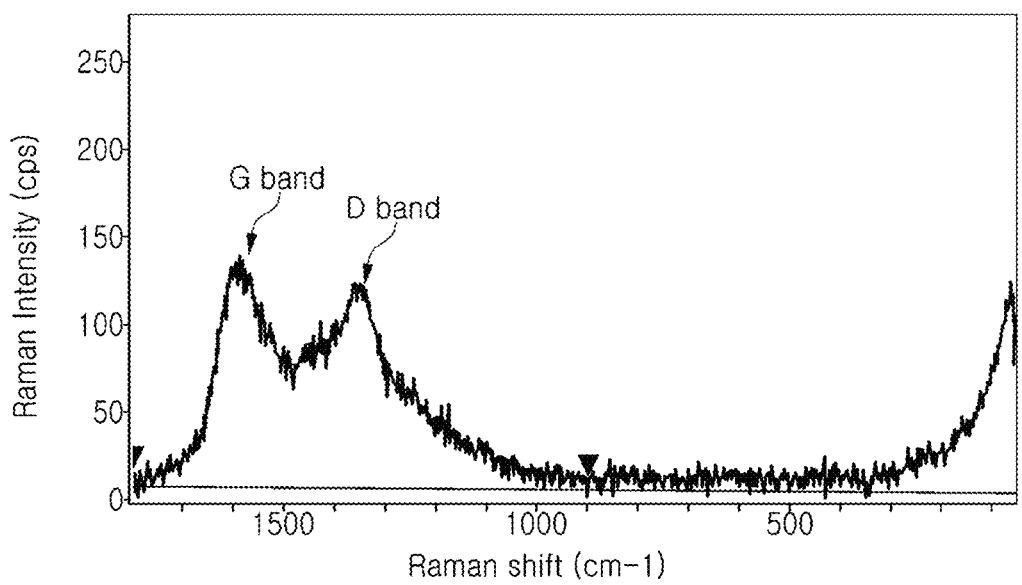
FIG. 7 is a graph illustrating a result of Raman analysis of the second electrode layer.

FIG. 7 is a graph illustrating a result of Raman analysis of the second electrode layer.

In an exemplary embodiment in the present disclosure, two peaks may be detected at the time of performing Raman analysis on the second electrode layers 132a and 132b. The two peaks may be detected in a D band and a G band. The G band may appear in the vicinity of 1580 cm$^{-1}$, and the D band may appear in the vicinity of 1350 cm$^{-1}$. The reason why the two peaks are detected at the time of performing Raman analysis on the second electrode layers 132a and 132b is that the second electrode layers 132a and 132b include the graphenes, and a Raman analysis graph different from that of other carbon materials may appear.

Examples

Table 1 shows experiment results obtained by measuring ion migration, adhesive strength, and coefficients of variation (CV) of equivalent series resistance (ESR) according to the area ratio of the carbon materials in the cross section of each of the second electrode layers 132a and 132b in the second and third directions.

All samples in Table 1 were sample chips (MLCCs) including the external electrodes 130a and 130b in which the second electrode layers 132a and 132b including silver (Ag) and palladium (Pd) are formed, respectively, on the first electrode layers 131a and 132a including copper (Cu), and were prepared under the same conditions except for the area ratio of the carbon materials.

<Measurement of Area Ratio of Carbon Materials>

The area ratio of the carbon materials was measured by polishing the sample chip up to the center of the sample chip in the first direction, capturing an image of the second electrode layer in the second and third directions with a scanning electron microscope (SEM), and then analyzing the image with energy dispersive X-ray spectroscopy (EDS). In this case, the area ratio of the carbon materials was measured by mapping carbon (C) elements under the conditions of an acceleration voltage of 15 kV and a working distance (WD) of 15 mm.

More specifically, referring to FIG. 6, an image of a cross section of the second electrode layer in the second and third directions scanned at a magnification of 2,000 with the scanning electron microscope (SEM) was analyzed with the energy dispersive X-ray spectroscopy (EDS), carbon (C) elements were mapped to a region in which a length in the second direction×a length in the third direction=60 μm×40 μm, and the area ratio of the carbon materials in the region was then measured through a program within the EDS.

In addition, the sample chip was heat-treated at 700° C. for 2 hours to volatilize an organic material, and Raman analysis was then performed on the second electrode layer. In this case, as illustrated in FIG. 7, the G band was measured in the vicinity of 1580 cm$^{-1}$ and the D band was measured in the vicinity of 1350 cm$^{-1}$. Accordingly, it was confirmed that the second electrode layer includes the carbon materials, more specifically, the graphenes.

<Evaluation of Ion Migration>

Figure 8:
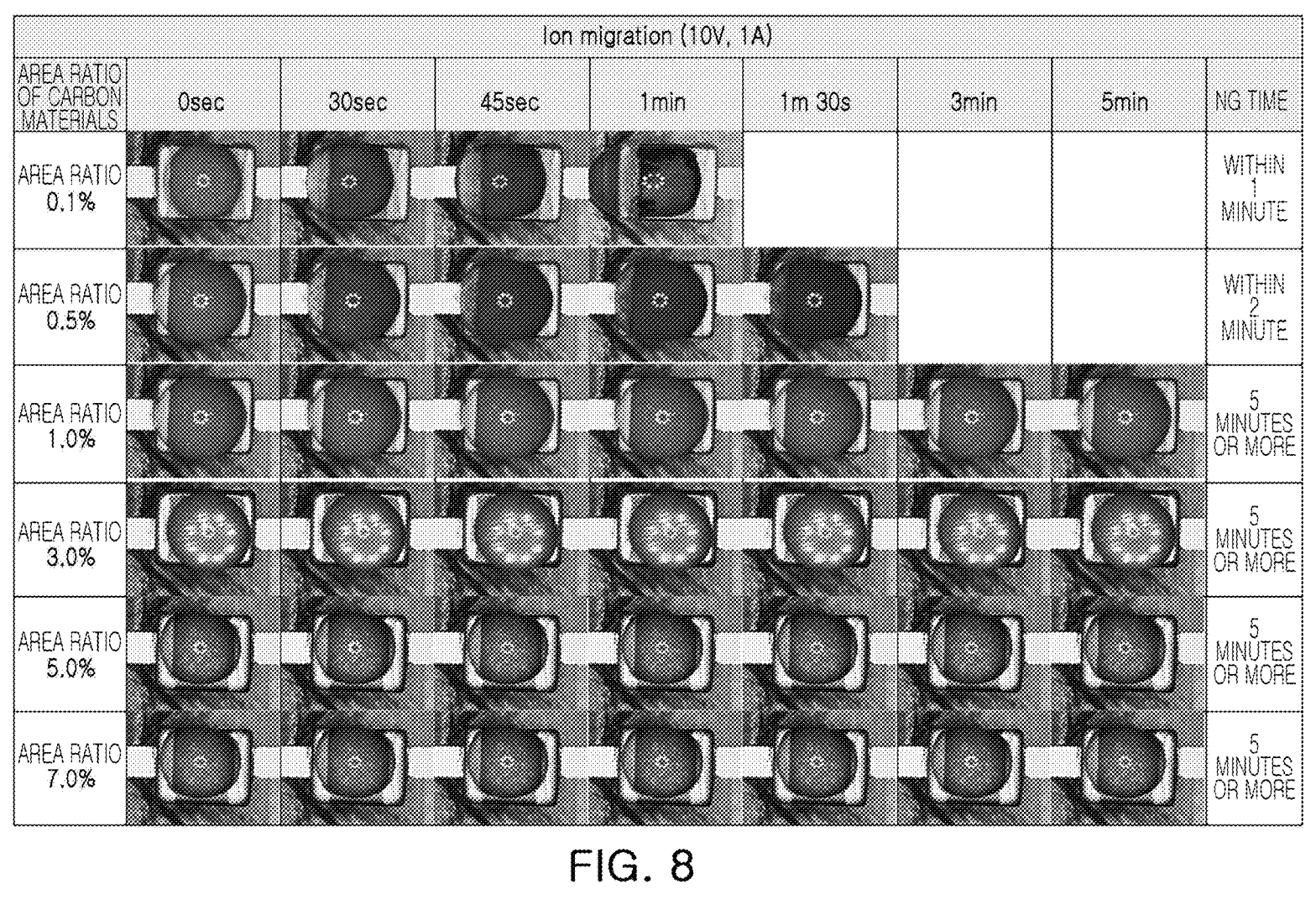

FIG. 8 is a compilation of captured images of an ion migration phenomenon according to an area ratio of carbon materials.

Ion migration of each of manufactured sample chips was evaluated through an ion migration measuring instrument. Test conditions were a relative humidity of 85%, a temperature of 85° C., a direct current (DC) voltage of 10 V, and a DC current of 1 A, and the ion migration was evaluated through a water drop (1000 μL) acceleration test method. Thereafter, as illustrated in FIG. 8, times required for ion migration to occur in each sample chip were measured.

<Evaluation of Adhesive Strength>

Figures 9, 10:
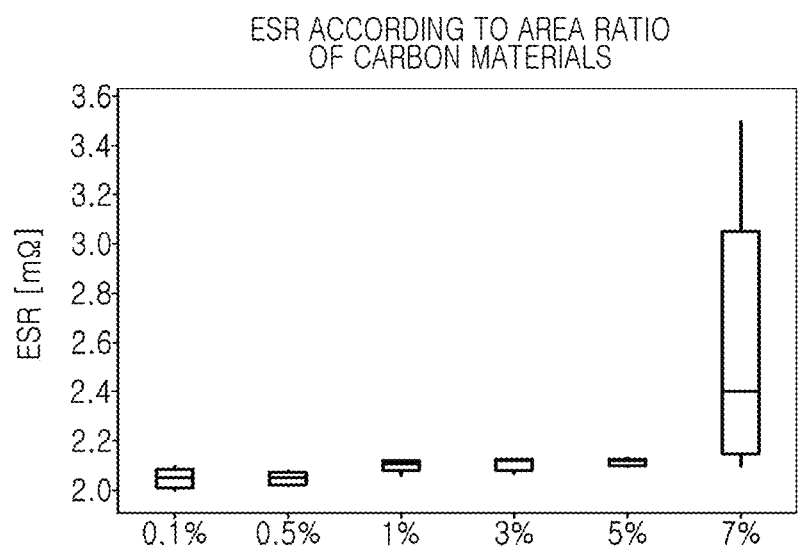
FIG. 9 is a compilation of captured images of forms in which an external electrode is destroyed by external stress according to an area ratio of carbon materials.
FIG. 10 is a graph illustrating evaluation results of equivalent series resistance (ESR) of the multilayer ceramic electronic component according to an area ratio of carbon materials.

FIG. 9 is a compilation of captured images of forms in which an external electrode is destroyed by external stress according to an area ratio of carbon materials.

Adhesive strength of each sample chip was measured by mounting each sample chip on a substrate with a silver (Ag) epoxy conductive glue, applying a force to each sample chip in a direction parallel to the substrate, and measuring a force applied to the sample chip when the sample chip was destroyed. In addition, a form in which each sample chip was destroyed was observed.

<Evaluation of Change in ESR>

FIG. 10 is a graph illustrating evaluation results of equivalent series resistance (ESR) of the multilayer ceramic electronic component according to an area ratio of carbon materials.

Equivalent series resistance (ESR) was measured for each sample at a self-resonant frequency using an LCR meter, and was illustrated in FIG. 10. In Table 1, coefficients of variation (CVs) of the ESR were measured and shown.

TABLE 1

| | Sample No. | | | | | | |
|---|---|---|---|---|---|---|---|
| | 1* | 2* | 3 | 4 | 5 | 6* | 7* |
| Area Ratio | 0.1% | 0.5% | 1.0% | 3.0% | 5.0% | 7.0% | 10.0% |
| Ion Migration | 1 minute | 1.5 minutes | 5 minutes or more | 5 minutes or more | 5 minutes or more | 5 minutes or more | Unmeasurable |
| Adhesive Strength Value | 42 to 45N | 40 to 42N | 38 to 40N | 30 to 35N | 25 to 30N | 15 to 20N | Unmeasurable |
| Destructive Mode | Occurrence of Chip Crack | Electrode Destruction | Glue Destruction | Glue Destruction | Glue Destruction | Electrode Peel-off | Unmeasurable |
| Coefficient of | 5% or less | 5% or less | 5% or less | 5% or less | 5% or less | 10% | Unmeasurable |

TABLE 1-continued

| | Sample No. | | | | | | |
|---|---|---|---|---|---|---|---|
| | 1* | 2* | 3 | 4 | 5 | 6* | 7* |
| Variation of ESR Decision | x | Δ | ○ | ○ | ○ | Δ | x |

\* is Comparative Example

Referring to Table 1 and FIG. 8, it can be seen that in a case of Sample Nos. 1\* and 2\* in which the area ratio of the carbon materials is less than 1%, ion migration of silver (Ag) metal particles occurs within 2 minutes, and thus, an ion migration preventing effect is decreased.

On the other hand, it can be seen that in a case of Sample Nos. 3, 4, and 5, a time required for ion migration to occur is 5 minutes or more, and ion migration may thus be effectively suppressed.

Referring to Table 1 and FIG. 9, it can be seen that in a case of Sample Nos. 1\* and 2\* in which the area ratio of the carbon materials is less than 1%, at the time of evaluating the adhesive strength, a crack occurs in the sample chip or destruction of the first electrode layer or the second electrode layer occurs, and a peel-off phenomenon between the first and second electrode layers occurs. Therefore, it can be seen that when the area ratio of the carbon materials is less than 1%, impact resistance of the second electrode layer is decreased.

It can be seen that in a case of Sample No. 6\* in which the area ratio of the carbon materials is more than 5%, the carbon materials are not uniformly distributed in the second electrode layer and agglomerate with each other at the time of performing sintering, such that adhesive strength is decreased. Accordingly, it can be seen that a peel-off phenomenon of the second electrode layer occurs at the time of evaluating the adhesive strength.

It can be seen that in particular, in a case of Sample No. 7\* in which the area ratio of the carbon materials is 10%, the carbon materials agglomerate with each other at the time of performing the sintering to form a large amount of air gaps or cause blisters or the like in the external electrodes, such that the first electrode layer and the second electrode layer are not stuck to each other and the external electrodes may not be formed by the sintering due to the air gaps and the blisters.

On the other hand, it can be seen that in a case of Sample Nos. 3, 4 and 5 in which the area ratio of the carbon materials is 1 to 5%, adhesive strength is good, and at the time of evaluating adhesive strength, the sample chip or the external electrode of the sample chip is not destroyed and only the conductive glue for mounting the sample chip is destroyed.

In addition, referring to Table 1 and FIG. 10, it can be seen that in a case of Sample No. 6\* in which the area ratio of the carbon materials exceeds 7%, a volume fraction occupied by the glass and the carbon materials is excessively high, such that a coefficient of variation (CV) increases. This is because the carbon materials are not uniformly distributed, and thus, act as noise.

Accordingly, it can be seen that the area ratio of the carbon materials in the cross section of at least a portion of the second electrode layer has a significant influence on mechanical and electrical properties of the multilayer ceramic electronic component, and when the area ratio of the carbon materials is 1 to 5%, the ion migration may be effectively suppressed, and the adhesive strength and the impact resistance of the external electrode may be improved to improve the reliability of the multilayer ceramic electronic component.

As set forth above, according to an exemplary embodiment in the present disclosure, a multilayer ceramic electronic component having improved heat and moisture resistance characteristics by including external electrodes having excellent adhesive strength and impact resistance may be provided.

While exemplary embodiments have been shown and described above, it will be apparent to those skilled in the art that modifications and variations could be made without departing from the scope of the present invention as defined by the appended claims.

What is claimed is:

1. A multilayer ceramic electronic component comprising:
a ceramic body including dielectric layers and internal electrodes;
first electrode layers disposed on the ceramic body and connected to the internal electrodes, respectively; and
second electrode layers disposed on the first electrode layers, respectively, and respectively including a conductive metal including silver and palladium, carbon materials, and glass particles,
wherein an area ratio of the carbon materials in a cross section of at least a portion of each of the second electrode layers is 1 to 5%.

2. The multilayer ceramic electronic component of claim 1, wherein the carbon materials include one or more of graphene, carbon nanotube, fullerene, and black carbon.

3. The multilayer ceramic electronic component of claim 1, wherein the ceramic body has first and second surfaces opposing each other in a first direction, third and fourth surfaces opposing each other in a second direction, and fifth and sixth surfaces opposing each other in a third direction, and
in at least one of a cross section of the second electrode layer in the first and second directions and a cross section of the second electrode layer in the second and third directions, an area ratio of the carbon materials is 1 to 5%.

4. The multilayer ceramic electronic component of claim 1, wherein the carbon materials include at least one of a spherical carbon material and a plate-shaped shape carbon material.

5. The multilayer ceramic electronic component of claim 4, wherein the carbon materials include both the spherical and plate-shaped carbon materials.

6. The multilayer ceramic electronic component of claim 1, wherein a diameter of the carbon materials is 0.25 μm to 4 μm.

7. The multilayer ceramic electronic component of claim 1, wherein ten or more carbon materials are disposed per area of 2500 μm$^2$ of the cross section.

8. The multilayer ceramic electronic component of claim 7, wherein the area is 50 μm×50 μm (width×length).

9. The multilayer ceramic electronic component of claim 1, wherein the conductive metal of the second electrode layer further includes at least one of platinum (Pt) and gold (Au).

10. The multilayer ceramic electronic component of claim 1, wherein the first electrode layer includes a conductive metal and glass, and the conductive metal of the first electrode layer includes copper (Cu).

11. The multilayer ceramic electronic component of claim 1, wherein two peaks are detected at the time of performing Raman analysis on the second electrode layer.

12. The multilayer ceramic electronic component of claim 11, wherein the carbon materials include graphene.

13. The multilayer ceramic electronic component of claim 11, wherein the two peaks are detected in a D band and a G band.

14. A method for manufacturing a multilayer ceramic electronic component comprising:

contacting a first electrode layer with a conductive paste including a conductive metal including silver (Ag) and palladium (Pd), carbon materials, and glass particles to form a second electrode layer, wherein the first electrode layer is disposed on a body of the multilayer ceramic electronic component, and sintering the conductive paste at a temperature of from 600 to 700° C. for 1 to 2 hours.

15. The method of claim 14, wherein an area ratio of the carbon materials in a cross section of at least a portion of the second electrode layer is 1 to 5%.

16. The method of claim 14, wherein the conductive paste consists of the conductive metal, the carbon materials, and the glass particles.

17. The method of claim 14, wherein the body includes dielectric layers and internal electrodes, and the first layer directly contacts the internal electrodes.

18. The method of claim 17, wherein the first electrode layer directly contacts the conductive paste.

19. The method of claim 14, wherein the carbon materials include at least one of a spherical carbon material or a plate-shaped carbon material.

* * * * *